(12) United States Patent
Tranier

(10) Patent No.: US 11,554,955 B2
(45) Date of Patent: Jan. 17, 2023

(54) PROCESS AND DEVICE FOR THE COMBINED PRODUCTION OF HYDROGEN AND CARBON DIOXIDE FROM A HYDROCARBON MIXTURE

(71) Applicant: L'Air Liquide, Société Anonyme pour l'Etude et l'Exploitation des Procédés Georges Claude, Paris (FR)

(72) Inventor: Jean-Pierre Tranier, L'Hay-les-Roses (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 154 days.

(21) Appl. No.: 16/765,588

(22) PCT Filed: Nov. 8, 2018

(86) PCT No.: PCT/FR2018/052774
§ 371 (c)(1),
(2) Date: May 20, 2020

(87) PCT Pub. No.: WO2019/102094
PCT Pub. Date: May 31, 2019

(65) Prior Publication Data
US 2020/0307997 A1    Oct. 1, 2020

(30) Foreign Application Priority Data

Nov. 22, 2017  (FR) ...................... 1761066

(51) Int. Cl.
| *C01B 3/48* | (2006.01) |
| *C01B 32/50* | (2017.01) |
| *B01D 53/047* | (2006.01) |
| *B01D 53/22* | (2006.01) |
| *B01J 19/00* | (2006.01) |
| *B01J 19/24* | (2006.01) |

(Continued)

(52) U.S. Cl.
CPC .............. *C01B 3/48* (2013.01); *B01D 53/047* (2013.01); *B01D 53/226* (2013.01); *B01D 53/229* (2013.01); *B01J 19/0013* (2013.01); *B01J 19/245* (2013.01); *C01B 3/501* (2013.01); *C01B 3/56* (2013.01); *C01B 32/50* (2017.08); *F25J 3/0223* (2013.01); *F25J 3/0252* (2013.01); *F25J 3/0266* (2013.01); *B01D 2256/16* (2013.01); *B01D 2257/504* (2013.01); *B01D 2257/7022* (2013.01); *B01D 2257/7025* (2013.01); *B01D 2257/7027* (2013.01); *B01J 2219/0004* (2013.01); *B01J 2219/00051* (2013.01); *C01B 2203/025* (2013.01); *C01B 2203/0233* (2013.01); *C01B 2203/0283* (2013.01); *C01B 2203/042* (2013.01); *C01B 2203/0405* (2013.01); *C01B 2203/048* (2013.01); *C01B 2203/0475* (2013.01); *C01B 2203/0495* (2013.01); *C01B 2203/1235* (2013.01); *F25J 2200/02* (2013.01); *F25J 2200/70* (2013.01); *F25J 2205/04* (2013.01); *F25J 2205/40* (2013.01); *F25J 2205/64* (2013.01); *F25J 2205/80* (2013.01); *F25J 2245/02* (2013.01)

(58) Field of Classification Search
CPC .. C01B 3/48; C01B 3/501; C01B 3/56; C01B 32/50; C01B 2203/0233; C01B 2203/025; C01B 2203/0283; C01B 2203/0405; C01B 2203/042; C01B 2203/0475; C01B 2203/048; C01B 2203/0495; C01B 2203/1235; C01B 2203/0288; C01B 2203/043; C01B 2203/046; C01B 2203/148; C01B 3/36; C01B 3/38; C01B 3/506; B01D 53/047; B01D 53/226; B01D 53/229; B01D 2256/16; B01D 2257/504; B01D 2257/7022; B01D 2257/7025; B01D 2257/7027; B01J 19/0013; B01J 19/245; B01J 2219/0004; B01J 2219/00051; F25J 3/0223; F25J 3/0252; F25J 3/0266; F25J 2200/02; F25J 2200/70; F25J 2205/04; F25J 2205/40; F25J 2205/64; F25J 2205/80; F25J 2245/02; Y02C 20/20; Y02C 20/40; Y02P 20/129; Y02P 20/151
See application file for complete search history.

(56) References Cited

U.S. PATENT DOCUMENTS

| 2009/0298957 A1 | 12/2009 | Gauthier et al. | |
| 2010/0129284 A1* | 5/2010 | Niitsuma | B01D 53/047 |
| | | | 423/437.1 |

(Continued)

FOREIGN PATENT DOCUMENTS

| EP | 2 141 119 | 1/2010 |
| EP | 2 873 939 | 5/2015 |

(Continued)

OTHER PUBLICATIONS

International Search Report for corresponding PCT/FR2018/052774, dated May 20, 2019.

*Primary Examiner* — Steven J Bos
*Assistant Examiner* — Syed T Iqbal
(74) *Attorney, Agent, or Firm* — Elwood L. Haynes

(57) ABSTRACT

The invention relates to a process for the combined production of hydrogen and carbon dioxide from a hydrocarbon mixture, in which the residual gas of a PSA $H_2$ (12) is separated by permeation in order to reduce the hydrocarbon content thereof and the hydrocarbon-purified gas is separated at a low temperature to produce a carbon dioxide-rich liquid (22).

9 Claims, 5 Drawing Sheets

(51) Int. Cl.
*C01B 3/50* (2006.01)
*C01B 3/56* (2006.01)
*F25J 3/02* (2006.01)

(56) References Cited

U.S. PATENT DOCUMENTS

2010/0147147 A1   6/2010  Marty et al.
2012/0241678 A1*  9/2012  Valentin .................. C01B 3/384
                                                                          252/373

FOREIGN PATENT DOCUMENTS

| FR | 2 953 505 | 6/2011 |
| WO | WO 2006 054008 | 5/2006 |
| WO | WO 2008 017783 | 2/2008 |
| WO | WO 2010 086635 | 8/2010 |

* cited by examiner

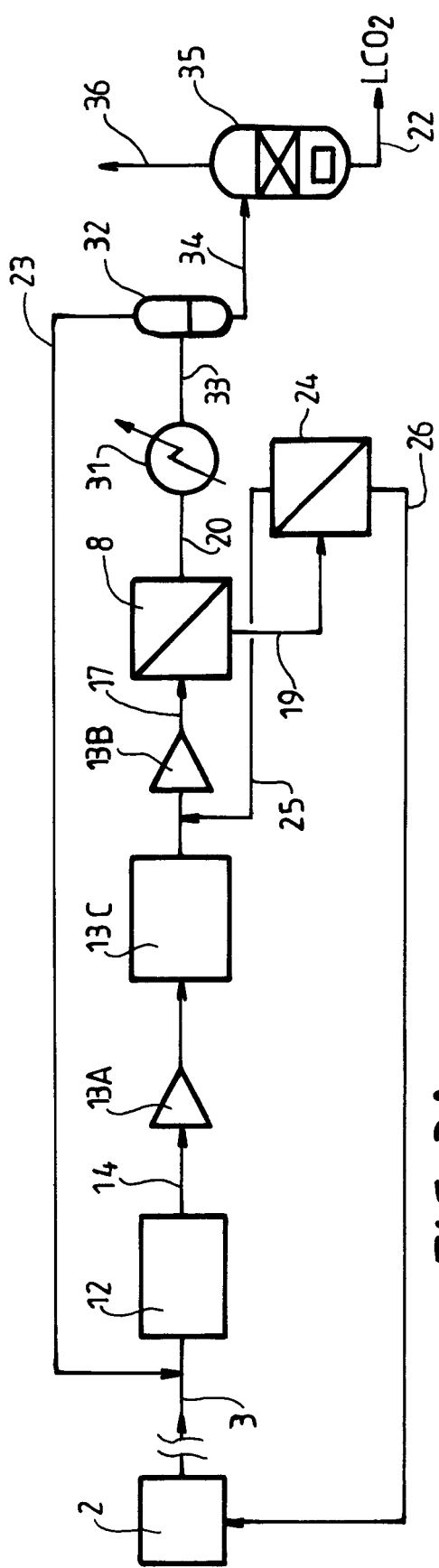
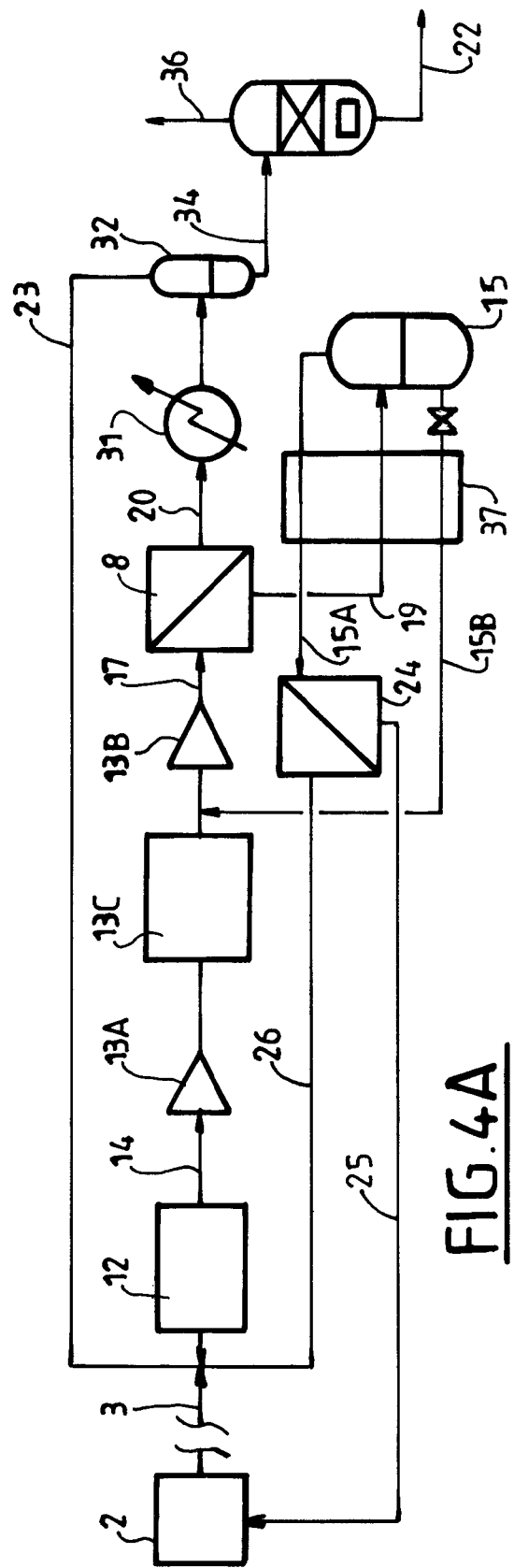
FIG.3A
FIG.4A

PROCESS AND DEVICE FOR THE COMBINED PRODUCTION OF HYDROGEN AND CARBON DIOXIDE FROM A HYDROCARBON MIXTURE

CROSS REFERENCE TO RELATED APPLICATIONS

This application is a 371 of International Application No. PCT/FR2018/052774, filed Nov. 8, 2018, which claims priority to French Patent Application No. 1761066, filed Nov. 22, 2017, the entire contents of which are incorporated herein by reference.

BACKGROUND

The present invention relates to a process for the combined production of hydrogen and carbon dioxide from a mixture of hydrocarbons in which the mixture of hydrocarbons is reformed in order to produce a synthesis gas containing hydrogen, carbon monoxide, carbon dioxide and at least one hydrocarbon which is cooled, then enriched in hydrogen ($H_2$) and carbon dioxide ($CO_2$), optionally dried, and treated in a pressure swing adsorption (PSA) unit for the purification of hydrogen in order to produce hydrogen (it being possible for the drying to precede or follow the purification), the residual being treated for the purpose of capturing $CO_2$. It also relates to a plant capable of implementing the process.

As climate change is one of the major environmental problems today, reducing greenhouse gas emissions, and very particularly reducing $CO_2$ emissions, is one of the great challenges facing man. In point of fact, one of the essential sources of $CO_2$ emissions is the combustion of fossil fuels.

The industrial plants emitting carbon dioxide include in particular the plants for the production of hydrogen and carbon monoxide which emit carbon dioxide via their flue gases, the $CO_2$ contained in the flue gases originating from the combustion of non-upgradable gases generated in the process and recycled in the form of fuels, and of that of additional fuels, such as naphtha and natural gas. $CO_2$ is captured on these plants both with regard to the $CO_2$ present in combustion flue gases, but also with regard to the $CO_2$ present in the synthesis gas produced by the process. Among the methods for capturing carbon dioxide present in the synthesis gas—that is to say produced during reforming or obtained by subsequent transformation of the synthesis gas—one of the methods used is the capture of carbon dioxide by compression and cooling of the residual gas resulting from the unit for the purification of hydrogen by pressure swing adsorption (PSA $H_2$), so as to liquefy a fraction of the carbon dioxide contained in the said residual gas.

This liquid carbon dioxide can subsequently be transported, stored, converted or used as required, it is desirable for the operator of the plant to upgrade the non-condensed gases resulting from this operation for capture of $CO_2$ by compression and purification or CPU (compression and purification unit).

There is thus known, from WO2006/054008, a process for the production of hydrogen in which the capture of carbon dioxide additionally makes it possible to increase the production of hydrogen of the plant. For this, the process employs stages of compression of the residual gas from the PSA, followed by a drying stage (it being possible for the drying, as described in WO2008/017783, to be carried out upstream of the PSA) with recovery of the carbon dioxide via a cryogenic purification unit (CPU). The non-condensable gases resulting from the CPU are treated by a membrane which allows the hydrogen to permeate. The hydrogen is returned upstream of the process, at the inlet of the PSA, in order to increase the production of hydrogen of the plant, the residual gas resulting from the membrane for its part being used in the reforming stage, as fuel and/or as feedstock intended to feed the reforming.

However, when it is desired to produce food-grade $CO_2$, care must also be taken to remove a certain number of impurities present in the residual gas resulting from the hydrogen purification (PSA $H_2$) unit. For the light impurities (methane, carbon monoxide, nitrogen, hydrogen, argon), it is possible to proceed by distillation, as described in WO2006/054008.

However, if the ethane content is high in the residual gas, it will be necessary to considerably increase the reboiling of this column in order to reach a final content of a few ppm, in comparison with a case where only the light impurities of methane, carbon monoxide, nitrogen, hydrogen or argon type would be removed in this column, which means a significant increase in the energy consumption of the unit.

For the heavy impurities, the same document proposes to carry out a stage of removal of heavy impurities by adsorption prior to the stage of partial condensation of the residual gas. Unfortunately, there does not exist a truly effective and economical adsorption system for removing a constituent such as propane, just as there is none for ethane either.

Another solution would consist in re-evaporating the liquid rich in $CO_2$ produced resulting from the partial condensation of the residual gas, in reheating it to a temperature of the order of 400 to 500° C., in injecting oxygen and in carrying out a catalytic oxidation in order to remove in particular hydrocarbons, such as ethane and propane, in then cooling and liquefying this $CO_2$, in carrying out a new distillation in order to remove the oxygen, so as to produce liquid food-grade carbon dioxide which can subsequently be transported and stored. However, this other solution is both expensive and complex.

According to the process of EP 2 141 119, the $CO_2$ has to be recompressed at the outlet of the membrane, while, according to the invention, a very high pressure is retained on the permeate side which is compatible with condensation of $CO_2$ in the CPU. In EP 2 141 119, the permeate is close to atmospheric pressure, which does not make it possible to directly condense it since the $CO_2$ can be in the liquid state only at a pressure of greater than 519 kPa, that is to say 5.19 bar abs or 0.519 MPa.

SUMMARY

The objective of the present invention is thus to meet the need to produce food-grade $CO_2$ without unduly complicating the plant. It consists in installing a membrane separation stage from which a permeate enriched in hydrogen and carbon dioxide will be recovered, where the amounts of impurities, in particular ethane, ethylene, propane and propene, are considerably reduced. Although this operation reduces the $CO_2$ partial pressure in the gas forming the subject of the partial condensation, it makes it possible to simplify the process. Furthermore, the non-condensable products resulting from the partial condensation are richer in hydrogen and they do not need to be purified by a membrane. They can be directly recycled upstream of the PSA $H_2$ in order to increase the production of hydrogen of the unit or be treated in a separate PSA $H_2$.

In some cases, it may be necessary to produce food-grade carbon dioxide, for example having a minimum purity of 99.8%.

According to a subject-matter of the invention, a process is provided for the combined production of hydrogen and carbon dioxide from a mixture of hydrocarbons comprising at least the following stages:

- a stage (a) of reforming or of partial oxidation of the mixture of hydrocarbons in order to obtain a synthesis gas containing at least hydrogen, carbon monoxide, carbon dioxide, methane, steam and possibly impurities, including at least one of the following hydrocarbons: ethane, propane, ethylene, propene, benzene or methanol,
- a stage (b) of cooling the synthesis gas with recovery of the available heat,
- a stage (c) of conversion (shift) reaction on all or part of the cooled synthesis gas in order to oxidize most of the carbon monoxide to give carbon dioxide with corresponding production of hydrogen and of a synthesis gas enriched in $H_2$ and $CO_2$ and containing impurities, including at least one of the following hydrocarbons: ethane, propane, ethylene, propene, benzene or methanol,
- a stage (d) of cooling the synthesis gas enriched in $H_2$ and $CO_2$ resulting from stage (c) with removal of the condensed water,
- an optional stage (e) of additional drying of the cooled synthesis gas in order to obtain a dry synthesis gas,
- a stage (f) of separation of the dry synthesis gas in a pressure swing adsorption (PSA $H_2$) unit, making it possible to obtain a high-pressure $H_2$ stream enriched in hydrogen and a PSA residual gas stream depleted in hydrogen containing at least carbon dioxide, hydrogen and at least one of the following hydrocarbons: ethane, propane, ethylene or propene,
- an optional stage (g) of drying the residual gas stream,
- a stage (h) of separation by permeation of the stream of the residual gas in a first membrane system in order to obtain a permeate depleted in at least one of the following hydrocarbons: ethane, propane, ethylene, propene, benzene or methanol and enriched in carbon dioxide and in hydrogen, as well as a non-permeate enriched in at least one of the following hydrocarbons: ethane, propane, ethylene or propene and depleted in carbon dioxide and in hydrogen, the permeate having a carbon dioxide partial pressure of greater than 519 kPa, preferably of greater than 1000 kPa, and
- a stage (i) of partial condensation and/or of distillation of the said permeate in order to obtain a liquid stream rich in $CO_2$ and a residual gas stream.

According to other optional stages:
- there is no stage of compression of the permeate between stages (h) and (i),
- the non-permeate from stage (h) is separated in a second membrane system,
- the non-permeate from stage (h) is partially condensed,
- the residual gas stream is sent to the pressure swing adsorption unit,
- at least a part of the non-permeate from stage (h) or a gas derived from this non-permeate is sent to the reforming or partial oxidation stage, as fuel for a burner of this stage,
- at least a part of the non-permeate from stage (h) or a gas derived from this non-permeate is sent to the reforming or partial oxidation stage as feed gas,
- the first and/or second membrane system removes at least one of the following hydrocarbons: ethane, propane, ethylene, propene, benzene or methanol, so that at least 80%, indeed even at least 90%, of the at least one hydrocarbon feeding the membrane system is re-encountered in the non-permeate from the first and/or second membrane system,
- the process can comprise a stage of compression in a compressor upstream of the first membrane system,
- a fluid derived from the non-permeate from the first membrane system is recycled upstream of the compressor,
- the liquid stream rich in $CO_2$ obtained is of food grade.

To this end, the invention provides a process for the combined production of hydrogen and carbon dioxide from a mixture of hydrocarbons comprising at least the following stages:

- a stage (a) of reforming or of partial oxidation of the mixture of hydrocarbons in order to obtain a synthesis gas containing at least hydrogen, carbon monoxide, carbon dioxide, methane, steam and possibly impurities, including at least one of the following hydrocarbons: ethane, propane, ethylene, propene, benzene or methanol,
- a stage (b) of cooling the synthesis gas with recovery of the available heat,
- a stage (c) of conversion (shift) reaction on all or part of the cooled synthesis gas in order to oxidize most of the carbon monoxide present to give carbon dioxide with corresponding production of hydrogen and of a synthesis gas enriched in $H_2$ and $CO_2$ and containing impurities, including at least one of the following hydrocarbons: ethane, propane, ethylene, propene, benzene or methanol,
- a stage (d) of cooling the synthesis gas enriched in $H_2$ and $CO_2$ resulting from stage (c) with removal of the condensed water,
- an optional stage (e) of additional drying of the cooled synthesis gas in order to remove the water molecules and to obtain a dry synthesis gas,
- a stage (f) of separation of the dry synthesis gas in a pressure swing adsorption (or PSA $H_2$) unit, making it possible to obtain a high-pressure stream $H_2$ enriched in hydrogen and a PSA residual gas stream Rpsa containing at least carbon dioxide, hydrogen and impurities,
- an optional stage (g) of drying the Rpsa stream,
- a stage (h) of compression (stage (g) can also be carried out after the stage of compression) and purification of the Rpsa stream comprising a first phase of separation by permeation (membrane), in order to obtain a permeate enriched in hydrogen and in carbon dioxide and depleted in most of the impurities, and a second phase of obtaining a liquid or supercritical stream rich in $CO_2$ and a residual gas stream RI enriched in hydrogen, and
- a stage (i) of capturing carbon dioxide via a stage of compression and purification of the Rpsa stream in order to obtain a liquid or supercritical stream rich in $CO_2$ and a residual gas stream RI enriched in hydrogen.

The drying stage (g) can be carried out before the compression stage of stage (h); when the compression stage comprises successive intermediate compressions, drying can be carried out during the compression stage, between two intermediate compressions; stage (g) can also be carried out after the compression stage.

The impurities, including at least one of the following hydrocarbons: ethane, propane, ethylene, propene, benzene or methanol, can be present in the synthesis gas from stage a) and/or can be produced during the shift stage c).

Preferably:
more than 90% of the methane entering the first membrane system is re-encountered in the non-permeate from the first membrane system,
more than 90% of the ethylene entering the first membrane system is re-encountered in the non-permeate from the first membrane system,
more than 90% of the methanol entering the first membrane system is re-encountered in the non-permeate from the first membrane system,
more than 98% of the ethane entering the first membrane system is re-encountered in the non-permeate from the first membrane system,
more than 98% of the propane entering the first membrane system is re-encountered in the non-permeate from the first membrane system,
more than 98% of the propene entering the first membrane system is re-encountered in the non-permeate from the first membrane system,
more than 98% of the benzene entering the first membrane system is re-encountered in the non-permeate from the first membrane system.

According to another subject-matter of the invention, an apparatus is provided for the combined production of hydrogen and carbon dioxide from a mixture of hydrocarbons comprising:
means for cooling a synthesis gas originating from an apparatus for the reforming or partial oxidation of a mixture of hydrocarbons in order to obtain the synthesis gas containing at least hydrogen, carbon monoxide, carbon dioxide, methane, steam and possibly impurities, including at least one of the following hydrocarbons: ethane, propane, ethylene, propene, benzene or methanol, with recovery of the available heat,
a reactor for conversion (shift) of all or part of the cooled synthesis gas in order to oxidize most of the carbon monoxide to give carbon dioxide with corresponding production of hydrogen and of a synthesis gas enriched in $H_2$ and $CO_2$ and containing impurities, including at least one of the following hydrocarbons: ethane, propane, ethylene, propene, benzene or methanol,
means for cooling the synthesis gas enriched in $H_2$ and $CO_2$ resulting from stage (c) with means for removing the condensed water,
optional means for additional drying of the cooled synthesis gas in order to obtain a dry synthesis gas,
a pressure swing adsorption (PSA $H_2$) unit for separating the optionally dry synthesis gas, making it possible to obtain a high-pressure $H_2$ stream enriched in hydrogen and a PSA residual gas stream depleted in hydrogen containing at least carbon dioxide, hydrogen and at least one of the following hydrocarbons: ethane, propane, ethylene or propene,
a first membrane system for separating by permeation the residual gas stream in order to obtain a permeate depleted in at least one of the following hydrocarbons: ethane, propane, ethylene, propene, benzene or methanol and enriched in carbon dioxide and in hydrogen, as well as a non-permeate enriched in at least one of the following hydrocarbons: ethane, propane, ethylene or propene and depleted in carbon dioxide and in hydrogen, the permeate having a carbon dioxide partial pressure of greater than 519 kPa, preferably of greater than 1000 kPa, and
means for separating by partial condensation and/or by distillation of the said permeate in order to obtain a liquid stream rich in $CO_2$ and a residual gas stream.

The apparatus can comprise:
a second membrane system in which the non-permeate from the first membrane system,
means for partially condensing the non-permeate from the first membrane system,
means for sending the residual gas stream to the pressure swing adsorption unit,
means for sending at least a part of the non-permeate from the first membrane system or a gas (26) derived from this non-permeate to a reforming or partial oxidation apparatus.

BRIEF DESCRIPTION OF THE DRAWINGS

Other characteristics and advantages of the present invention will become apparent on reading the description below of nonlimiting implementational examples, descriptions made with reference to the appended figures, in which:

FIG. 3A shows in more detail the last part of the process of FIG. 3.

FIG. 4A shows in more detail the last part of the process of FIG. 4.

DETAILED DESCRIPTION OF PREFERRED EMBODIMENTS

Figure 1:
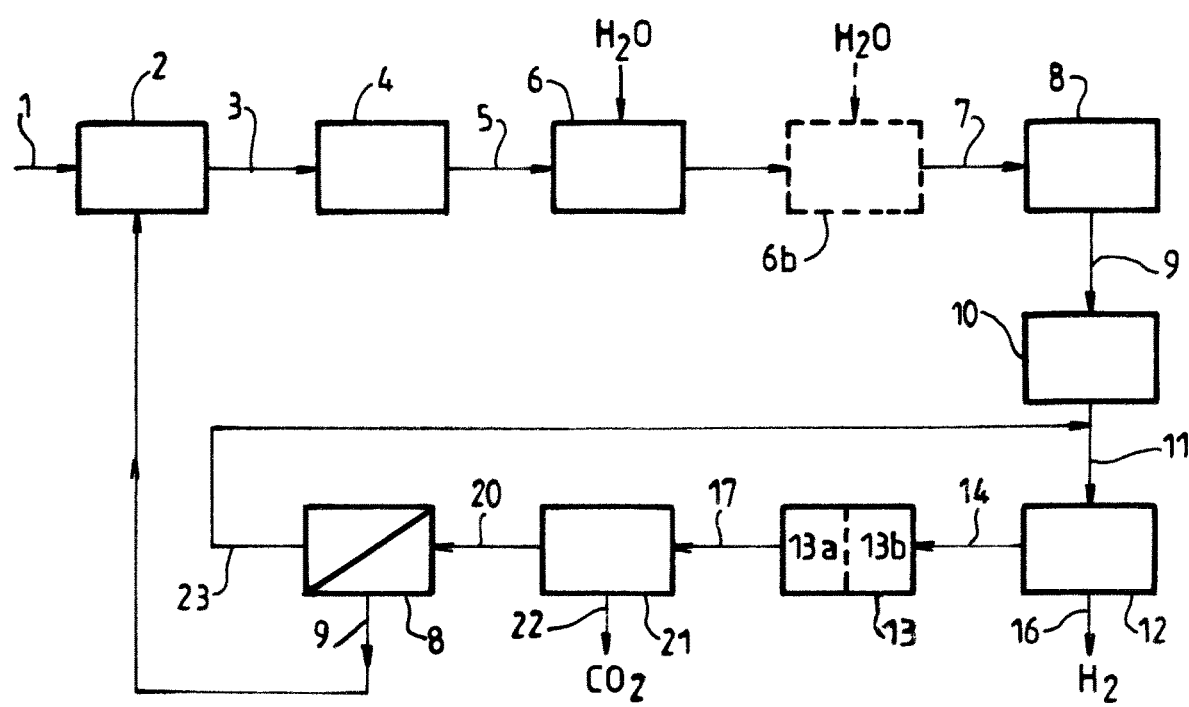
FIG. 1 is a diagrammatic view of a process for the combined production of hydrogen and carbon dioxide as described in WO2006/054008 (state of the art).

FIG. 1 describes the state of the art in which a feedstock of hydrocarbons 1 mixed with steam (not represented) feeds a reformer 2 in order to generate a synthesis gas 3 containing at least carbon monoxide, hydrogen, carbon dioxide, unreacted methane and impurities. This steam reforming stage is carried out in a steam reforming furnace containing tubes filled with catalysts, the heat necessary for the reforming being supplied by combustion.

The synthesis gas 3 is then cooled in 4, the cooled synthesis gas 5 subsequently being subjected, in 6, to a shift reaction during which the carbon monoxide reacts with water (represented but not referenced) in order to be—partly—converted into hydrogen and carbon dioxide. The reaction involved ($CO+H_2O \rightarrow CO_2+H_2$) is called water gas reaction or shift reaction. This conversion reaction is generally carried out on synthesis gas at high temperature (HT shift) or at medium temperature (MT shift); a second shift stage 6b can be carried out downstream of the preceding one, on the partially converted synthesis gas, at lower temperature (low temperature shift)—this second conversion stage 6b is represented in broken lines; it is not compulsory. The synthesis gas obtained 7—at the outlet of stage 6 or of stage 6b when stage 6 is followed by a stage 6b—is enriched in $H_2$ and $CO_2$ and depleted in CO; it is cooled in 8, then the cooled gas 9 is dried in 10 (for example using a TSA type adsorption process) in order to remove the water molecules and to thus obtain a dry gas mixture 11—in view of the downstream treatment of the gas—which dry gas mixture is subsequently subjected to a separation stage in a pressure swing adsorption or PSA $H_2$ unit 12 in order to produce a gas stream 16 of hydrogen produced and a PSA residual gas stream 14 (residual Rpsa). The stream 14 is subsequently treated in order to capture the carbon dioxide therefrom; for this, it is compressed (substage 13a), so that its pressure is between 20 and 100 bar, and it undergoes a substage 13b of purification by adsorption, so as to remove certain heavy impurities, such as benzene or methanol.

Subsequently, it undergoes one or more successive stages of condensation/separation in the CPU unit 21 in order to obtain a liquid stream 22 enriched in $CO_2$ and a gas stream 20 (residual RI) enriched in hydrogen and other non-condensable constituents, in particular in carbon monoxide and methane. The stream 20 is subsequently subjected to a stage of separation in a permeation unit 8 through a membrane in order to produce a gas stream 23 (permeate) enriched in hydrogen (Hii stream) and a gas stream 19 enriched in carbon monoxide and in methane. This gas stream 19 can, for example, be sent as fuel to the reformer 2. The drying of the synthesis gas, upstream and/or downstream of the PSA (not represented), makes it possible to remove the water which is harmful to the good progression of the downstream process.

Figure 2:
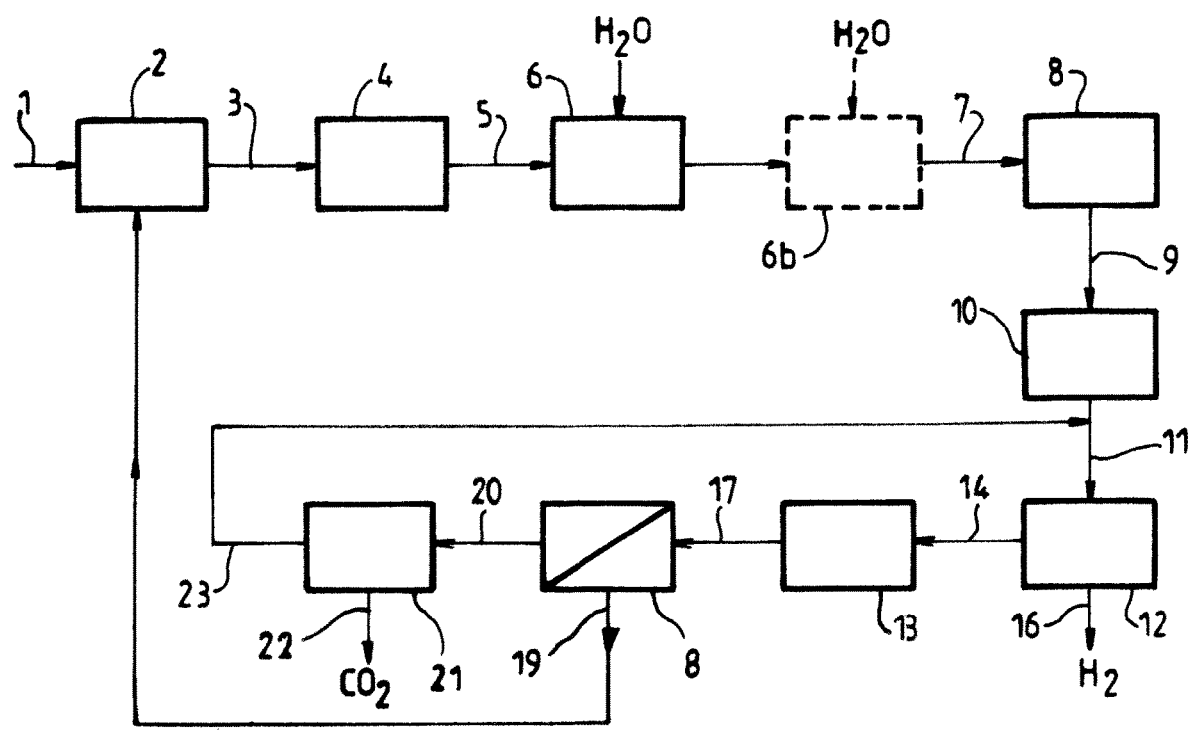
FIG. 2 is a diagrammatic view of a process for the combined production of hydrogen and carbon dioxide according to a base configuration of the invention.

In FIG. 2 according to the invention, a feedstock of hydrocarbons 1 mixed with steam (not represented) feeds a reformer 2 in order to generate a synthesis gas 3 containing at least carbon monoxide, hydrogen, carbon dioxide, unreacted methane and impurities, including at least the following hydrocarbons: ethane, propane, ethylene or propene.

This steam reforming stage is carried out in a steam reforming furnace containing tubes filled with catalysts, the heat necessary for the reforming being supplied by combustion. The synthesis gas 3 is then cooled in 4, the cooled synthesis gas 5 subsequently being subjected, in 6, to a shift reaction during which the carbon monoxide reacts with water (represented but not referenced) in order to be—partly—converted into hydrogen and carbon dioxide. The reaction involved ($CO+H_2O \rightarrow CO_2+H_2$) is called water gas reaction or shift reaction. This conversion reaction is generally carried out on synthesis gas at high temperature (HT shift) or at medium temperature (MT shift); a second shift stage 6b can be carried out downstream of the preceding one, on the partially converted synthesis gas, at lower temperature (low temperature shift)—this second conversion stage 6b is represented in broken lines; it is not compulsory. The synthesis gas obtained 7—at the outlet of stage 6 or of stage 6b when stage 6 is followed by a stage 6b—is enriched in $H_2$ and $CO_2$ and depleted in CO; it is cooled in 8, then the cooled gas 9 is dried in 10 (for example using a TSA type adsorption process) in order to remove the water molecules and to thus obtain a dry gas mixture 11—in view of the downstream treatment of the gas which dry gas mixture is subsequently subjected to a separation stage in a pressure swing adsorption or PSA $H_2$ unit 12 in order to produce a gas stream 16 of hydrogen produced and a PSA residual gas stream 14 (residual Rpsa). The stream 14 is subsequently treated in order to capture the carbon dioxide therefrom; for this, it is compressed in a compressor 13 so that its pressure is between 20 and 100 bar, in order to produce the gas 17. It can undergo a substage of purification by adsorption so as to remove certain heavy impurities, such as benzene or methanol. Subsequently, it is separated in a membrane system 8 in order to produce a permeate 20 enriched in carbon dioxide and in hydrogen and a non-permeate depleted in carbon dioxide and in hydrogen and containing at least 90% of the at least one hydrocarbon present in the gas 17. The permeate 20, having a $CO_2$ partial pressure of at least 519 kPa, is not compressed and undergoes one or more successive stages of condensation/separation in the CPU unit 21 in order to obtain a liquid stream 22 enriched in $CO_2$ and a gas stream 23 enriched in hydrogen and in other non-condensable constituents, in particular in carbon monoxide and methane. The stream 23 is returned to the adsorption unit 12 in order to separate it with the gas 11.

The non-permeate 19 enriched in at least one of the following hydrocarbons: ethane, propane, ethylene or propene and depleted in carbon dioxide and in hydrogen is sent as fuel to the furnace 2.

The membrane of the membrane system 17 can operate between ambient temperature and 100° C., preferably in the vicinity of 80° C., for example between 70° C. and 90° C. The membrane can be a polymer membrane capable of separating the hydrogen which can be a polyamide, polyaramid, polybenzimidazoles, mixture of polybenzimidazole and polyamides.

Figure 3:
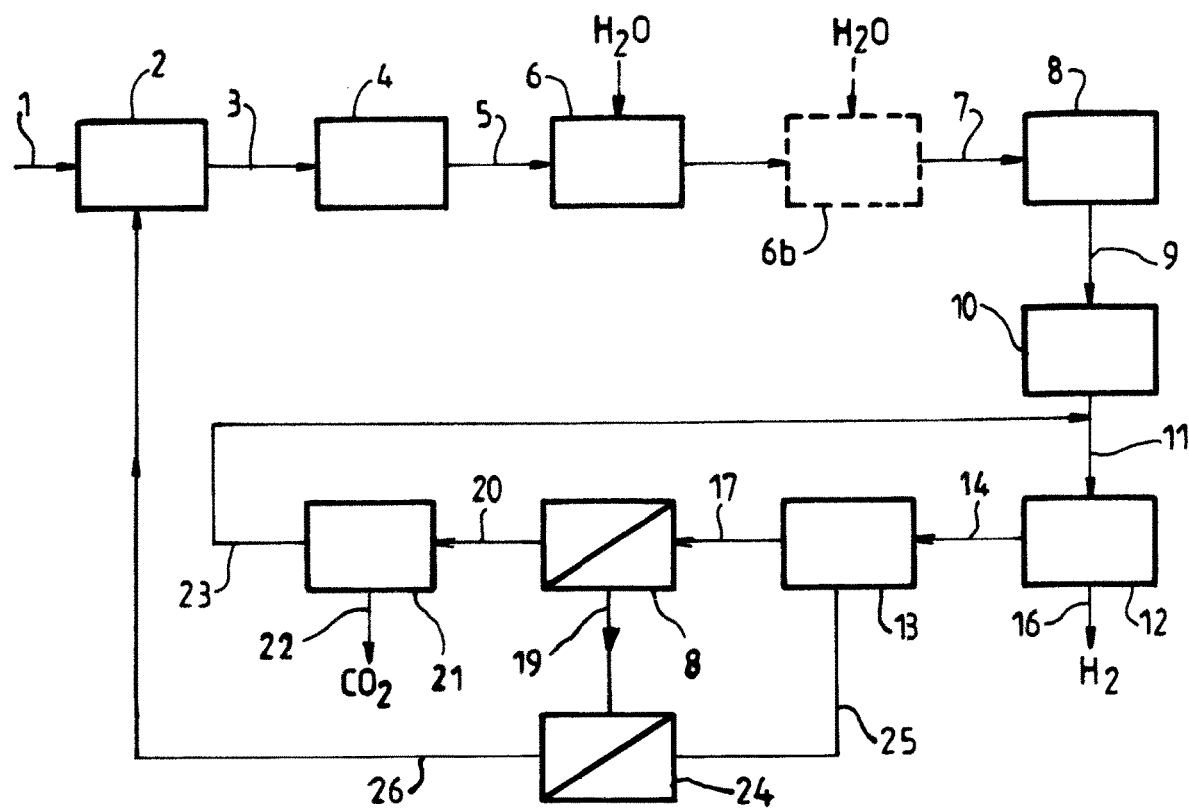
FIG. 3 is a diagrammatic view of a process according to the invention which differs from that of FIG. 2 in that a second membrane stage makes it possible to improve the recovery of hydrogen and of carbon dioxide.

In FIG. 3, only the differences from FIG. 2 will be described. The non-permeate 19 from the first membrane system 17 is sent to a second membrane system 24. The non-permeate 19 enriched in at least one of the following hydrocarbons: ethane, propane, ethylene or propene and depleted in carbon dioxide and in hydrogen is separated in the second membrane system 24. The permeate 25 from the second membrane system 24 enriched in $CO_2$ with respect to the non-permeate 19 is returned to the compression stage 13. The non-permeate 26 from the second membrane system 24 is sent to the reforming 2.

In FIG. 3A, the processing stages 4, 6, 8 and 10 of FIG. 3 are omitted: on the other hand, stages 12 to 24 are illustrated in more detail.

After the stage of adsorption in the unit 12, which produces hydrogen 16 and a flow 14 depleted in hydrogen, the flow 14 is compressed by the compressor 13A, purified of water (case where the drying is downstream of the PSA) and/or of methanol and/or of benzene in the adsorber 13C and compressed again by the compressor 13B. The flow 17 produced by the compressor 13B is separated in order to produce a flow 20 enriched in $CO_2$ and depleted in at least one hydrocarbon. The flow 20 is cooled by the cooler 31, the cooled flow 33 is partially condensed and separated in a phase separator 32, the gas 23 from which is returned to the adsorption 12. The liquid 34 is separated by distillation in a distillation column 35 in order to produce a gas 36 and a liquid rich in carbon dioxide 22. The non-permeate 19 from the first membrane system 8 is sent to a second membrane system 24, the permeate 25 from which is sent upstream of the compressor 13B and the non-permeate 26 from which is sent to the reformer 2.

The following table shows data for the process of FIGS. 3 and 3A.

one hydrocarbon. The flow 20 is cooled by the cooler 31, the cooled flow 33 is partially condensed and separated in a phase separator 32, the gas 23 from which is returned to the adsorption 12. The liquid 34 is separated by distillation in a distillation column 35 in order to produce a gas 36 and a

TABLE 1

| FIG. 3 | Membrane 8 | | | Membrane 24 | | |
|---|---|---|---|---|---|---|
| Name | 17 | 19 | 20 | 19 | 26 | 25 |
| Steam | 1 | 1 | 1 | 1 | 1 | 1 |
| Temperature [C.] | 82.00 | 79.22 | 80.93 | 79.22 | 67.42 | 75.22 |
| Pressure [bar] | 47.30 | 45.79 | 25.60 | 45.79 | 45.50 | 9.89 |
| Molar flow [Nm3/h*] | 31 426 | 17 346 | 14 080 | 17 346 | 5943 | 11 403 |
| Mass Flow [kg/h] | 41 173 | 22 560 | 18 614 | 22 560 | 6504 | 16 056 |
| Molar Concentration | | | | | | |
| $CO_2$ | 0.53941269 | 0.47232622 | 0.62206223 | 0.47232622 | 0.16488324 | 0.63257652 |
| Nitrogen | 8.09E−03 | 1.28E−02 | 2.28E−03 | 1.28E−02 | 2.77E−02 | 5.02E−03 |
| CO | 0.10764726 | 0.16048029 | 4.26E−02 | 0.16048029 | 0.3140941 | 8.04E−02 |
| Hydrogen | 0.22444731 | 0.15521411 | 0.3097416 | 1.55E−01 | 1.59E−02 | 2.28E−01 |
| Methane | 0.12034078 | 0.19906286 | 2.34E−02 | 1.99E−01 | 4.77E−01 | 5.42E−02 |
| Ammonia | 3.21E−10 | 2.42E−10 | 4.20E−10 | 2.42E−10 | 4.07E−11 | 3.46E−10 |
| Ethane | 4.66E−05 | 8.28E−05 | 1.99E−06 | 8.28E−05 | 2.32E−04 | 5.02E−06 |
| Ethylene | 2.87E−06 | 4.72E−06 | 5.97E−07 | 4.72E−06 | 1.11E−05 | 1.37E−06 |
| Propane | 3.86E−06 | 6.97E−06 | 3.37E−08 | 6.97E−06 | 2.02E−05 | 8.64E−08 |
| Propene | 2.16E−06 | 3.88E−06 | 3.60E−08 | 3.88E−06 | 1.12E−05 | 9.19E−08 |
| Methanol | 1.10E−05 | 1.93E−05 | 7.83E−07 | 1.93E−05 | 5.27E−05 | 1.94E−06 |
| Benzene | 9.57E−09 | 1.73E−08 | 3.29E−11 | 1.73E−08 | 5.04E−08 | 8.44E−11 |

| Products | Residues(%) | Permeates(%) | Residues (%) | Permeates(%) |
|---|---|---|---|---|
| $CO_2$ | 48.33 | 51.67 | 11.96 | 88.04 |
| Nitrogen | 87.37 | 12.63 | 74.21 | 25.79 |
| CO | 82.29 | 17.71 | 67.06 | 32.94 |
| Hydrogen | 38.17 | 61.83 | 3.52 | 96.48 |
| Methane | 91.30 | 8.70 | 82.11 | 17.89 |
| Ammonia | 41.50 | 58.50 | 5.78 | 94.22 |
| Ethane | 98.08 | 1.92 | 96.02 | 3.98 |
| Ethylene | 90.68 | 9.32 | 80.85 | 19.15 |
| Propane | 99.61 | 0.39 | 99.19 | 0.81 |
| Propene | 99.25 | 0.75 | 98.44 | 1.56 |
| Methanol | 96.82 | 3.18 | 93.39 | 6.61 |
| Benzene | 99.85 | 0.15 | 99.68 | 0.32 |

Thus, it is found that more than 90% of the methane, ethylene and methanol in the flow 17 and more than 98% of the ethane, propane, propene and benzene in the flow 17 is re-encountered in the non-permeate 19 from the first membrane system 8.

The second membrane system 24 is used to remove more than 98% of the ethane, propane, propene and benzene in the flow 17, which is re-encountered in the non-permeate 26.

Figure 4:
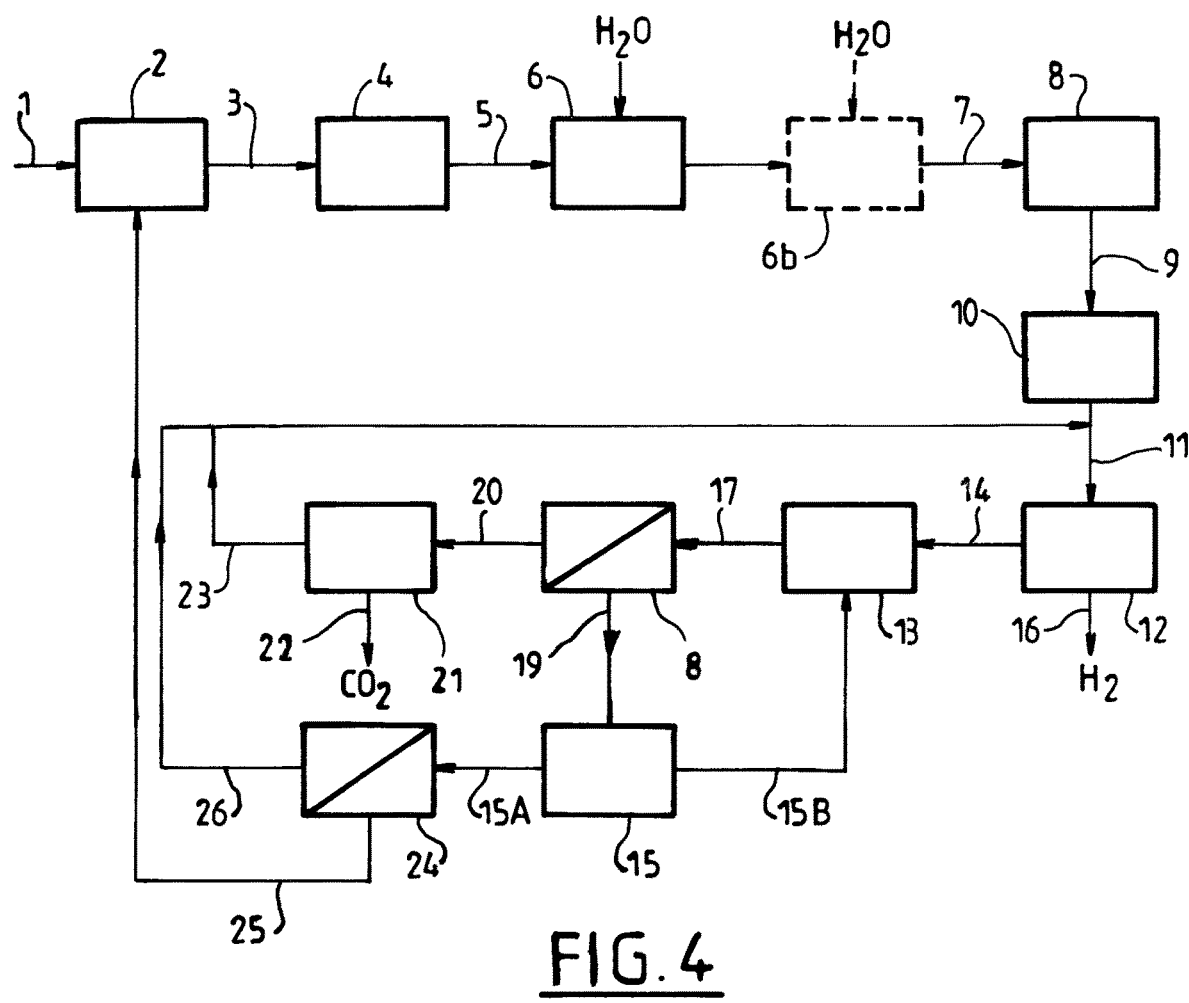
FIG. 4 is a diagrammatic view of a process according to the invention which differs from that of FIG. 2 in that a second partial condensation and a second membrane stage make it possible to improve even more the recovery of hydrogen and of carbon dioxide from the gas. The case has also been represented where the fraction rich in hydrogen is purified in an independent PSA $H_2$, so as to avoid an additional modification of the initial unit in the event of renovation.

In FIG. 4, the non-permeate 19 undergoes condensation 15 in order to recycle a condensate enriched in $CO_2$ 15B towards the compression 13 and the non-condensables 15A pass into a second membrane 24 in order to separate a fraction rich in hydrogen 26, recycled upstream of the PSA, and a fraction 25 rich in carbon monoxide and methane, which goes to the burners of the reformer 2.

In FIG. 4A, the processing stages 4, 6, 8 and 10 of FIG. 4 are omitted: on the other hand, stages 12 to 24 are illustrated in more detail.

After the stage of adsorption in the unit 12, which produces hydrogen 16 and a flow 14 depleted in hydrogen, the flow 14 is compressed by the compressor 13A, purified of water (case where the drying is downstream of the PSA) and/or of methanol and/or of benzene in the adsorber 13C and compressed again by the compressor 13B. The flow 17 produced by the compressor 13B is separated in order to produce a flow 20 enriched in $CO_2$ and depleted in at least one hydrocarbon. The flow 20 is cooled by the cooler 31, the cooled flow 33 is partially condensed and separated in a phase separator 32, the gas 23 from which is returned to the adsorption 12. The liquid 34 is separated by distillation in a distillation column 35 in order to produce a gas 36 and a liquid rich in carbon dioxide 22. This liquid can contain 99.8% of carbon dioxide at least, being of food grade.

The non-permeate 19 from the first membrane system 8 is sent to a heat exchanger 37 in order to be partially condensed and is separated in a phase separator 15. The gas formed 15A is reheated in the exchanger 37 and sent to a second membrane system 24, the permeate 25 of which is sent upstream of the PSA 12 and the non-permeate 26 of which is sent to the reformer 2.

The liquid 15B from the phase separator 15 is expanded and then vaporized in the exchanger 37 in order to be sent upstream of the compressor 13B.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the combined production of hydrogen and carbon dioxide from a mixture of hydrocarbons comprising:
(a) reforming or partially oxidizing the mixture of hydrocarbons in order to obtain a synthesis gas containing at least hydrogen, carbon monoxide, carbon dioxide, methane, steam and at least one of the following hydrocarbons: ethane, propane, ethylene, propene, benzene or methanol, (b) cooling the synthesis gas with recovery of the available heat, (c) shift reacting all or part of the cooled synthesis gas in order to oxidize most of the carbon monoxide to give carbon dioxide with corresponding production of hydrogen and of a synthesis gas enriched in $H_2$ and $CO_2$ and containing impurities, including at least one of the following hydrocarbons: ethane, propane, ethylene, propene, benzene or methanol, (d) cooling the synthesis gas enriched in $H_2$ and $CO_2$ resulting from step (c) with removal of condensed water, (e) additionally drying the cooled synthesis gas in order to obtain a dry synthesis gas, (f) separating the dry synthesis gas in a pressure swing adsorption unit, thereby obtaining a high-pressure $H_2$ stream enriched in hydrogen and a PSA residual gas stream depleted in hydrogen containing at least carbon dioxide, hydrogen and at least one of the following hydrocarbons: ethane, propane, ethylene or propene, (g) drying the residual gas stream, (h) separating by permeation the stream of the residual gas in a first membrane system, thereby obtaining a permeate depleted in at least one of the following hydrocarbons: ethane, propane, ethylene, propene, benzene or methanol and enriched in carbon dioxide and in hydrogen, as well as a non-permeate enriched in at least one of the following hydrocarbons: ethane, propane, ethylene or propene and depleted in carbon dioxide and in hydrogen, the permeate having a carbon dioxide partial pressure of greater than 519 kPa, and (i) partially condensing and/or distilling the permeate in order to obtain a liquid stream rich in $CO_2$ and a residual gas stream.

2. The process according to claim 1, wherein there is no step of compression of the permeate between steps (h) and (i).

3. The process according to claim 1, wherein the non-permeate from step (h) is separated in a second membrane system.

4. The process according to claim 1, wherein the non-permeate from step (h) is partially condensed.

5. The process according to claim 1, wherein at least a part of the non-permeate from step (h) or a gas derived from this non-permeate is sent to the reforming or partial oxidation step, as fuel for a burner of this step.

6. The process according to claim 1, wherein at least a part of the non-permeate from step (h) or a gas derived from this non-permeate is sent to the reforming or partial oxidation step as feed gas.

7. The process according to claim 1, wherein the first and/or a second membrane system removes at least one of the following hydrocarbons: ethane, propane, ethylene, propene, benzene or methanol, so that at least 80% of the at least one hydrocarbon feeding the membrane system is re-encountered in the non-permeate from the first and/or second membrane system.

8. The process according to claim 1, further comprising a step of compression in a compressor upstream of the first membrane system.

9. The process according to claim 8, wherein a fluid derived from the non-permeate from the first membrane system is recycled upstream of the compressor.

\* \* \* \* \*